United States Patent
Ohara

(10) Patent No.: US 10,583,584 B2
(45) Date of Patent: Mar. 10, 2020

(54) TIRE VULCANIZATION MOLD, TIRE VULCANIZATION DEVICE, AND TIRE PRODUCTION METHOD

(71) Applicant: Toyo Tire Corporation, Itami-shi, Hyogo (JP)

(72) Inventor: Masaaki Ohara, Itami (JP)

(73) Assignee: TOYO TIRE CORPORATION, Itami-shi (JP)

(*) Notice: Subject to any disclaimer, the term of this patent is extended or adjusted under 35 U.S.C. 154(b) by 0 days.

(21) Appl. No.: 16/321,536

(22) PCT Filed: Aug. 12, 2016

(86) PCT No.: PCT/JP2016/003731
§ 371 (c)(1),
(2) Date: Jan. 29, 2019

(87) PCT Pub. No.: WO2018/029728
PCT Pub. Date: Feb. 15, 2018

(65) Prior Publication Data
US 2019/0176367 A1    Jun. 13, 2019

(51) Int. Cl.
*B29D 30/06* (2006.01)
*B29C 33/02* (2006.01)
(Continued)

(52) U.S. Cl.
CPC ............. *B29C 33/02* (2013.01); *B29C 35/02* (2013.01); *B29D 30/0606* (2013.01);
(Continued)

(58) Field of Classification Search
CPC ............ B29D 30/0606; B29D 30/0629; B29C 33/005
See application file for complete search history.

(56) References Cited

U.S. PATENT DOCUMENTS 3,057,011 A * 10/1962 Knox ................. B29D 30/0606
                                                425/46
3,460,197 A *  8/1969 Breza ................ B29D 30/0629
                                                425/46
(Continued)

FOREIGN PATENT DOCUMENTS

JP       8-216620 A     8/1996
JP      10-244812 A     9/1998
(Continued)

OTHER PUBLICATIONS

International Search Report dated Sep. 13, 2016, issued in counterpart application No. PCT/JP2016/003731 (2 pages).

*Primary Examiner* — James P Mackey
(74) *Attorney, Agent, or Firm* — Westerman, Hattori, Daniels & Adrian, LLP

(57) ABSTRACT

A tire vulcanization mold disclosed herein includes sectors 13 divided in a tire circumferential direction and molding a tread portion 1 of a tire, and a pair of upper and lower side plates 11 and 12 molding a sidewall portion 2 of the tire. Mold parting lines 16*a* and 17*a* formed by the sectors 13 and a pair of the upper and lower side plates 11 and 12 are located in the tread portion 1. The mold parting lines 16*a* and 17*a* are set within a range PR which accounts for up to 7.5% of a width BW of an outermost belt 5*a* of the tire on each of an outer side and an inner side than belt end positions BP of the outermost belt in a tire width direction.

9 Claims, 9 Drawing Sheets

(51) Int. Cl.
  *B29C 35/02*   (2006.01)
  *B29C 33/00*   (2006.01)

(52) U.S. Cl.
  CPC ........ B29D 30/0662 (2013.01); *B29C 33/005* (2013.01); *B29D 30/0629* (2013.01); *B29D 2030/0613* (2013.01); *B29D 2030/0616* (2013.01); *B29D 2030/0677* (2013.01)

(56) References Cited

U.S. PATENT DOCUMENTS

| | | | | |
|---|---|---|---|---|
| 3,464,090 | A * | 9/1969 | Cantarutti | B29D 30/0605 425/47 |
| 4,553,918 | A * | 11/1985 | Yoda | B29D 30/0606 425/46 |
| 4,895,692 | A * | 1/1990 | Laurent | B29C 43/102 264/326 |
| 5,190,767 | A * | 3/1993 | Beres | B29D 30/0629 425/28.1 |
| 5,208,044 | A * | 5/1993 | Miyata | B29C 33/202 425/32 |
| 5,769,976 | A | 6/1998 | Omokawa et al. | |
| 6,066,283 | A * | 5/2000 | Nara | B29D 30/0629 264/326 |
| 6,408,910 | B1 * | 6/2002 | Lagnier | B29C 33/42 152/209.17 |
| 6,808,377 | B1 * | 10/2004 | Loney | B29D 30/0629 264/102 |
| 7,459,117 | B2 * | 12/2008 | Girard | B29D 30/0629 156/110.1 |
| 2003/0143294 | A1 * | 7/2003 | Fike | B29D 30/0629 425/54 |
| 2004/0018262 | A1 * | 1/2004 | Reep | B29D 30/0629 425/35 |

FOREIGN PATENT DOCUMENTS

| | | |
|---|---|---|
| JP | 2000-84936 A | 3/2000 |
| JP | 2001-96538 A | 4/2001 |
| JP | 2002-67625 A | 3/2002 |
| JP | 2015-54506 A | 3/2015 |

* cited by examiner

TIRE VULCANIZATION MOLD, TIRE VULCANIZATION DEVICE, AND TIRE PRODUCTION METHOD

TECHNICAL FIELD

The present invention relates to a tire vulcanization mold, a tire vulcanization device including the tire vulcanization mold, and a tire production method.

BACKGROUND ART

A tire is produced by preparing an unvulcanized green tire first and then by vulcanizing the green tire while molding the green tire into a predetermined shape by using a tire vulcanization device.

A tire vulcanization device known in the art includes a vulcanization mold used to mold a green tire into a predetermined shape, which includes sectors for forming a tread portion of a tire, and a pair of upper and lower side plates for forming a sidewall portion of the tire.

While the tire vulcanization device is in a mold open state in which the upper side plate and the sectors are spaced apart from the lower side plate, a green tire is set on the lower side plate. Then, by moving down the upper side plate and moving the sectors inward in a tire radial direction, the tire vulcanization device is changed to a mold close state in which the upper side plate and the sectors are in close proximity to the lower side plate. The multiple sectors are divided in a circumferential direction. The sectors are radially separated in the mold open state whereas the sectors gather together and form an annular shape in the mold close state.

A pattern of various rugged shapes is provided to an outer surface of the tread portion and the sidewall portion. A rugged shape continuing from the tread portion to the sidewall portion is provided in some cases to make a design of the tire more sophisticated. In a case where such a pattern is provided, when mold parting lines formed by the sectors and the side plates are disposed to the sidewall portion, rubber squeezed out from the mold parting lines may possibly set at an easy-to-notice spot in outward appearance.

Meanwhile, a technique to dispose mold parting lines formed by the sectors and the side plates to the tread portion is known in the art (see Patent Literatures 1 and 2). With this technique, rubber squeezed out in the easy-to-notice sidewall portion can be limited.

CITATION LIST

Patent Literatures

Patent Literature 1: JP-A-2001-96538
Patent Literature 2: JP-A-2000-84936

SUMMARY OF INVENTION

Technical Problem

However, when the mold parting lines are disposed to the tread portion, the sectors reduce a diameter to close the mold after the green tire is sandwiched between a pair of the upper and lower side plates. Hence, biting occurs often at the mold parting lines formed by the sectors and the side plates. In particular, in a case where the mold parting lines are set to divide a rib used to mold lateral grooves, shoulder portions of the green tire are pushed in by the rib of the side plates and inner portions rise as an outcome of deformation. Accordingly, when the sectors reduce the diameter, biting occurs more often in parting planes defined by the sectors and the side plates. A rubber film formed on the mold parting planes due to such biting generally has a high protruding height from a tire surface and therefore gives a considerable influence on an outward appearance.

In view of the foregoing problems, the present invention has an object to provide a tire vulcanization mold having a mold parting line formed by sectors and a side plate disposed to a tread portion and capable of limiting biting of a green tire at the mold parting line.

Solution to Problem

A tire vulcanization mold of the present invention is a tire vulcanization mold used to vulcanize and mold a tire, which includes sectors divided in a tire circumferential direction and molding a tread portion of the tire, and a pair of upper and lower side plates molding a sidewall portion of the tire. Mold parting lines formed by the sectors and a pair of the upper and lower side plates are located in the tread portion. The mold parting lines are set within a range which accounts for up to 7.5% of a width of an outermost belt of the tire on each of an outer side and an inner side than belt end positions of the outermost belt in a tire width direction.

In one embodiment, the tire vulcanization mold may further include a lateral groove molding rib molding a lateral groove in the tread portion. The lateral groove molding rib may be formed by joining a first rib portion provided to the sector and a second rib portion provided to the side plate at the mold parting line. In such a case, the tread portion may include a first land portion having a first tread end and a second land portion having a second tread end located on an outer side than the first tread end in the tire width direction. Also, the lateral groove molding rib may be a rib used to mold a lateral groove dividing the first land portion and the second land portion. A recess used to mold a rising portion at a groove bottom of the lateral groove may be provided to a joined portion of the first rib portion and the second rib portion. A planar chamfered portion or a curved portion may be provided to an edge corner close to a top surface of one or both of the first rib portion and the second rib portion in a joined portion of the first rib portion and the second rib portion.

A tire vulcanization device of the present invention includes any one of the tire vulcanization molds configured as above, a segment fixed to the sector and moving the sector in a tire radial direction, and a pair of upper and lower attachment plates fixed to a pair of the upper and lower side plates, respectively, and supporting the segment in a slidable manner.

In one embodiment, the tire vulcanization device may be configured in such a manner that the segment includes a pair of upper and lower sliding surfaces sliding on a pair of the upper and lower attachment plates, respectively, a pair of the upper and lower sliding surfaces inclines to an inner side in the tire width direction more on an outer side in the tire radial direction, and when the segment moves the sector outward in the tire radial direction, a pair of the upper and lower sliding surfaces slides on a pair of the upper and lower attachment plates, respectively, and spacings at mold parting planes including the mold parting lines widen. In such a case, the mold parting planes including the mold parting lines may be provided parallel to the tire radial direction.

A tire production method of the present invention includes a forming step of forming a green tire, and a vulcanizing step of vulcanizing and molding the green tire by using any one of the tire vulcanization devices configured as above.

Advantageous Effects of Invention

According to the embodiments above, by setting positions of the mold parting lines and the belt end positions of the outermost belt as described above, biting of the green tire at the mold parting lines can be limited.

DESCRIPTION OF EMBODIMENTS

Hereinafter, embodiments of the present invention will be described with reference to the drawings.

Figure 1:
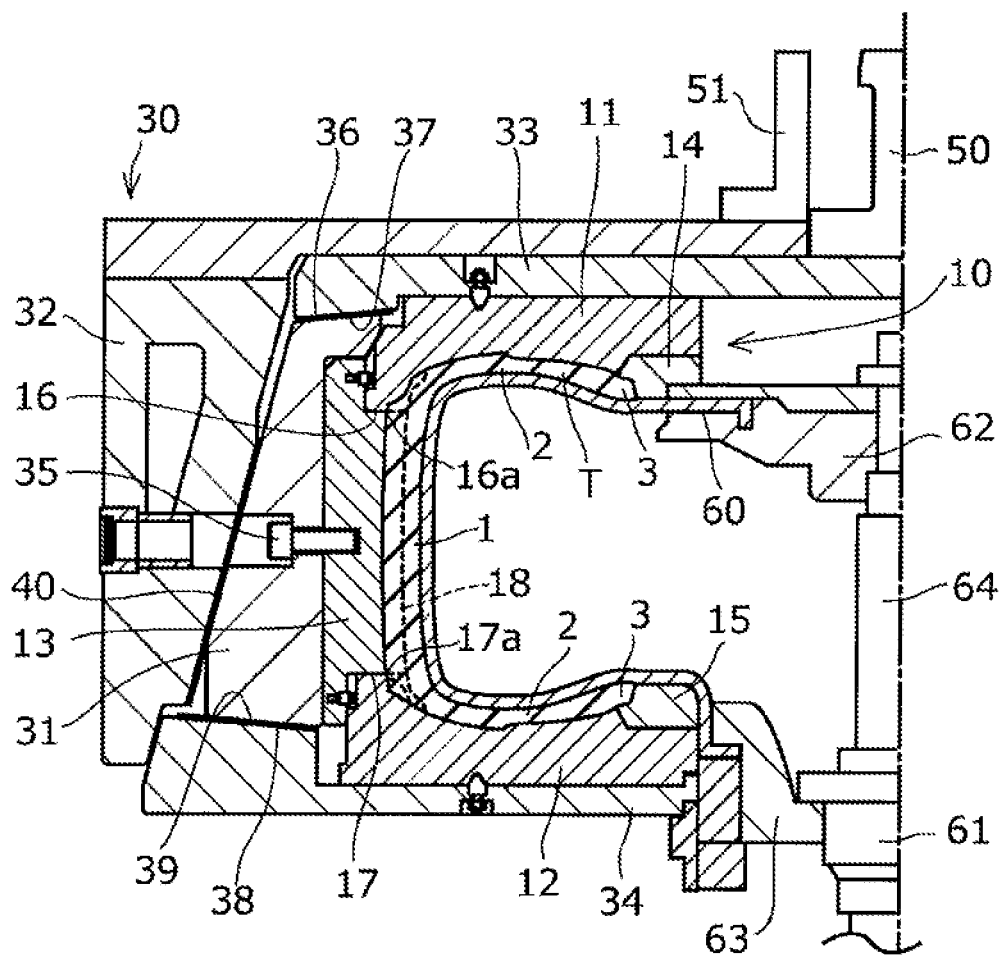
FIG. 1 is a half sectional view showing a tire vulcanization device according to one embodiment during vulcanization.

As is shown in FIG. 1, a tire vulcanization device includes a tire vulcanization mold (hereinafter, referred to simply as a vulcanization mold) 10, a container 30 to which the vulcanization mold 10 is attached, first lifting means 50 and second lifting means 51 which lift the vulcanization mold 10 and the container 30 up and down, and a bladder 60. The tire vulcanization device vulcanizes an unvulcanized green tire set with a tire axial direction aligned in a top-bottom direction while molding the green tire into a predetermined shape by heating and application of pressure.

The vulcanization mold 10 is a mold which includes a pair of an upper side plate 11 and a lower side plate 12, multiple sectors 13 divided in a circumferential direction, and a pair of upper and lower bead rings 14 and 15, and forms an outer surface (design surface) of a tire T. The vulcanization mold 10 can be made of a metal material, such as aluminum, aluminum alloy, and iron.

The sectors 13 are a mold which molds a tread portion 1 of the tire T. The multiple (for example, nine) sectors 13 are divided in a tire circumferential direction and allowed to undergo displacement radially (in a tire radial direction) by expansion and contraction. In a mold close state in which the respective sectors 13 are disposed at mold closing positions, the sectors 13 situated adjacently in the tire circumferential direction gather together and form an annular shape.

The upper side plate 11 is a mold which molds a sidewall portion 2 and a bead portion 3 disposed on an upper side of the tire T. The lower side plate 12 is a mold which molds a sidewall portion 2 and a bead portion 3 disposed on a lower side. The bead rings 14 and 15 are provided, respectively, on an inside of the upper side plate 11 and the lower side plate 12 in the tire radial direction. The bead rings 14 and 15 are formed for the bead portions 3 of the tire T to fit in.

The vulcanization mold 10 includes parting lines of a coupled mold which divide the mold in a tire width direction, to be more specific, a mold parting line 16a formed by the sectors 13 and the upper side plate 11 and a mold parting line 17a formed by the sectors 13 and the lower side plate 12. The mold parting lines 16a and 17a are located in the tread portion 1 of the tire T. Hence, the vulcanization mold 10 is configured to separate the sectors 13 from a pair of the upper and lower side plates 11 and 12 in the tire width direction in a tread surface.

Both of mold parting planes including the mold parting lines 16a and 17a, to be more specific, a mold parting plane 16 which is a coupled surface of the sectors 13 and the upper side plate 11 and a mold parting plane 17 which is a coupled surface of the sectors 13 and the lower side plate 12 extend outward in the tire radial direction from the mold parting lines 16a and 17a, respectively. Herein, both of the mold parting planes 16 and 17 are provided parallel (that is, horizontal) to the tire radial direction in which the sectors 13 move. The mold parting lines 16a and 17a are parting lines located at inner ends of the mold parting planes 16 and 17, that is, at ends facing a cavity.

Figure 3:
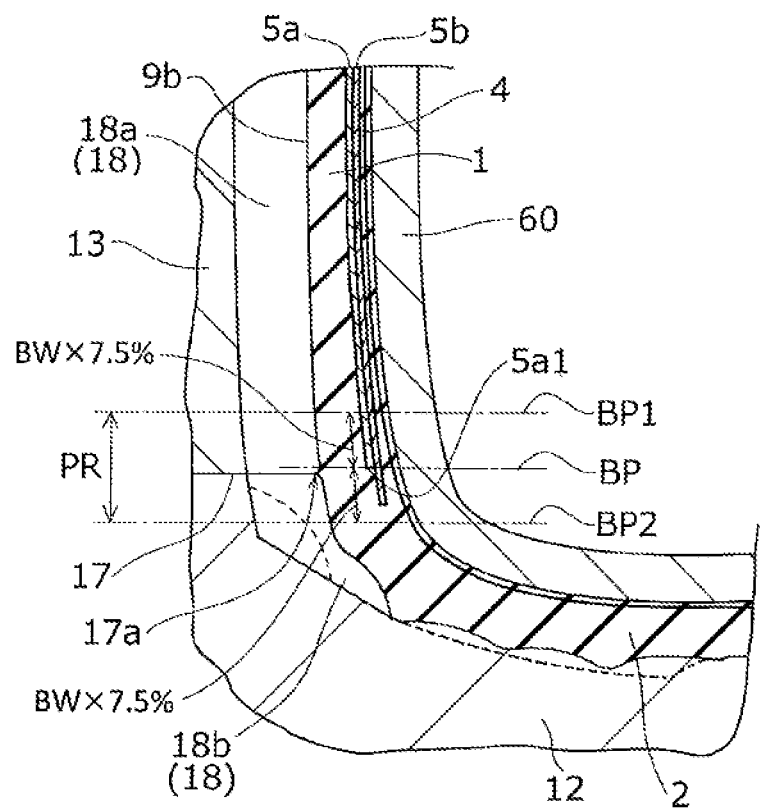
FIG. 3 is a sectional view taken along the line of FIG. 2 during tire vulcanization.

The mold parting lines 16a and 17a are set in the vicinity of belt end positions BP of an outermost belt 5a of the tire T (see FIG. 3). More specifically, the mold parting lines 16a and 17a are set within a range (hereinafter, referred to as a parting line set range) PR which accounts for up to 7.5% of an outermost belt width BW on each of an outer side and an inner side than the belt end position BP of the outermost belt 5a in the tire width direction. The parting line set position PR is more preferably a range which accounts for up to 5% of the outermost belt width BW on each of the outer side and the inner side than the outermost belt end position BP in the tire width direction. In FIG. 3, only the mold parting line 17a on the lower side alone is shown. It should be appreciated, however, that the same can be said for the mold parting line 16a on the upper side.

The outermost belt 5a is a belt at an outermost position in the tire radial direction. In the tread portion 1, multiple (herein, two) belts 5a and 5b are provided on an outer peripheral side of a carcass ply 4. Each of the belts 5a and 5b is formed of cords, such as steel cords, inclined at a constant angle with respect to the tire circumferential direction. The outermost belt 5a is one of the multiple belts 5a and 5b located on the outermost side. However, a belt having a width less than half a tread width TW is not deemed as the outermost belt even when the belt is located at the outermost position. That is, the outermost belt is a belt located at the outermost position among belts as wide as or wider than half the tread width TW.

Figure 5:
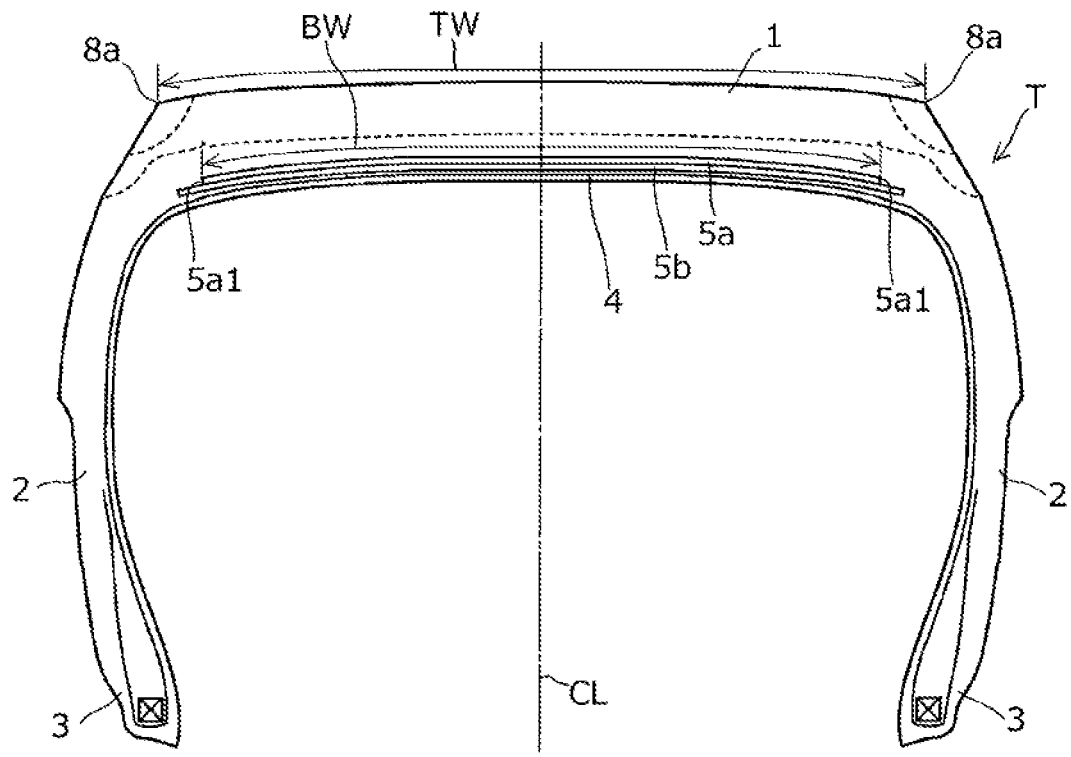
FIG. 5 is a sectional view of a tire of the embodiment.

The tread width TW is a length of a line linking tire contact ends of a tread surface (tire contact patch), which are outermost positions in the tire width direction, along an outlined profile of the tread surface (see FIG. 5). Herein, the tread width TW is a length of a line linking second tread ends 8a and 8a described below.

The belt end position BP of the outermost belt 5a is a position of a belt end 5a1 of the outermost belt 5a in the tire width direction. The belt end 5a1 is an end of the outermost belt 5a in the tire width direction. The outermost belt width BW is a length of a line linking the belt ends 5a1 and 5a1 of the outermost belt 5a along an outlined profile of the outermost belt 5a (see FIG. 5). The parting line set range PR is a region sandwiched between a position BP1 located on the inner side than the belt end position BP in the tire width direction by 7.5% of the outermost belt width BW along the outlined profile and a position BP2 located on the outer side than the belt end position BP in the tire width direction by 7.5% of the outermost belt width BW along the outlined profile, and including the both end positions BP1 and BP2.

The tread width TW and the outermost belt width BW are values measured when a pair of bead portions of a tire at no internal pressure is fixed at a normal rim position. For example, the tread width TW and the outermost belt width BW can be measured by using a cut sample prepared by cutting a tire and fixing a pair of the bead portions at a normal rim width position. A sectional shape in this state is close to a sectional shape during vulcanization molding, that is, a sectional shape in the state shown in FIG. 1 and can be deemed as being the same. Hence, the mold parting positions may be set according to the sectional shape of FIG. 1. The term, "a normal rim", means a rim specified for each tire according to standards of a tire in question in gauge systems including the standards of the tire. For example, a normal rim means a standard rim according to JATMA, a design rim according to TRA, and a measuring rim according to ETRTO.

Figure 2:
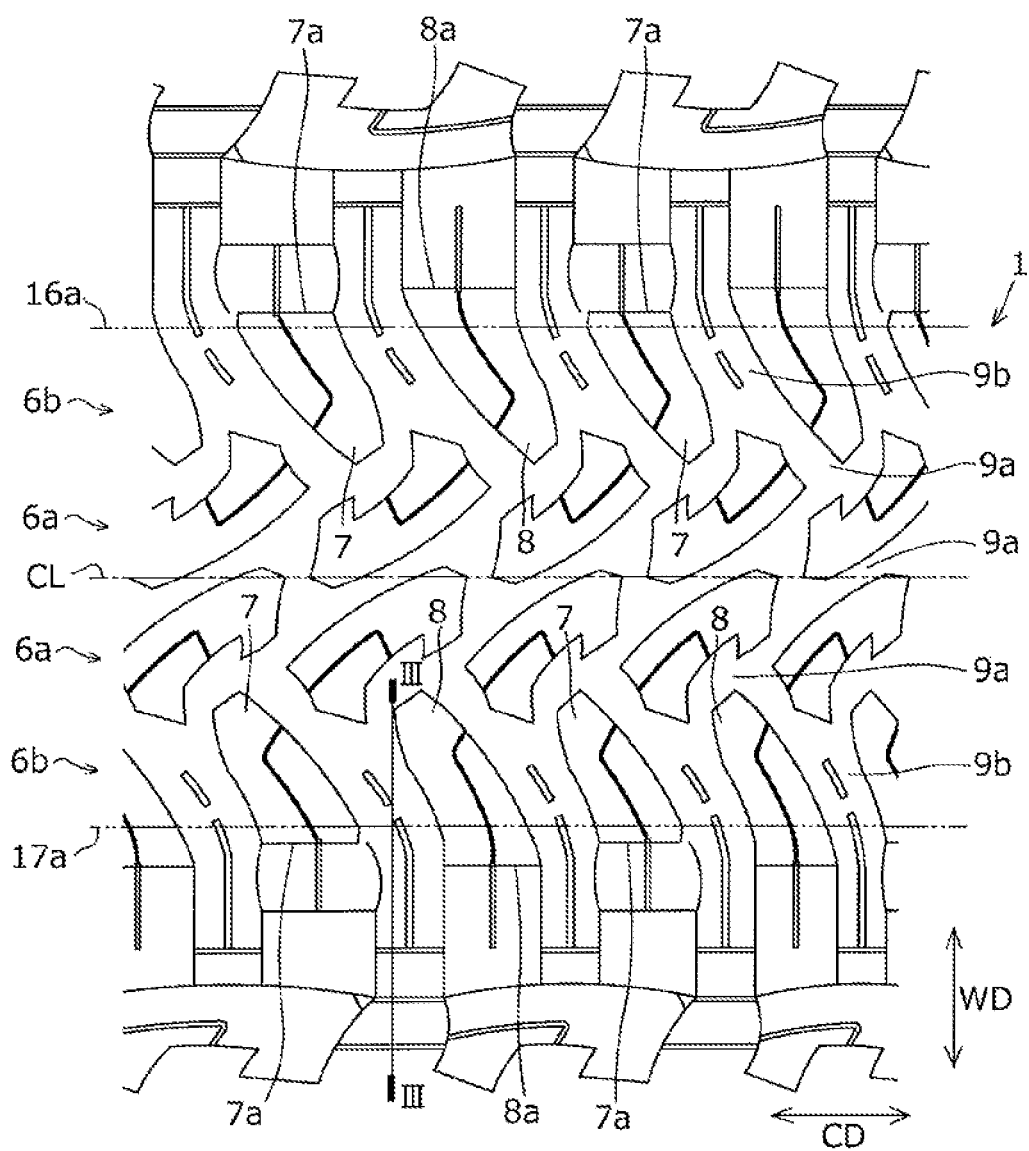
FIG. 2 is a plan view of a tread pattern of the embodiment.

FIG. 2 is a view showing an example of a tread pattern. As is shown in FIG. 2, the tread portion 1 includes multiple blocks divided by main grooves 9a extending in the tire circumferential direction while bending and lateral grooves 9b crossing the main grooves 9a. The lateral groove 9b may have a maximum groove depth. For example, a depth of the lateral groove 9b may be set equal to a height of the main groove 9a. It should be noted, however, that even when the lateral groove 9a has the maximum groove depth, the lateral groove 9a may include a portion where the groove depth is shallow in part as in a case where the lateral groove 9b has a rising portion 9b1, which will be described below.

In FIG. 2, the tire circumferential direction is a direction indicated by an arrow CD and the tire width direction is a direction indicated by an arrow WD. An inner side in the tire width direction (that is, on a side closer to a center) means a direction coming closer to a tire equator CL and an outer side in the tire width direction means a direction moving away from the tire equator CL.

The tread portion 1 has a pair of center block rows 6a and 6a located in a center region including the tire equator CL, and a pair of shoulder block rows 6b and 6b located in shoulder regions on both sides of the center block rows 6a and 6a. The shoulder regions mean regions located at ends of the tread portion in the tire width direction, in other words, regions sandwiched between the main grooves and tire contact ends and including the tire contact ends.

The shoulder block row 6b includes a first land portion (block) 7 having a first tread end 7a and a second land portion (block) 8 having a second tread end 8a located on the outer side than the first tread end 7a in the tire width direction. Herein, the shoulder block row 6b is formed by providing the first land portion 7 and the second land portion 8 extending more to the outside than the first land portion 7 in the tire width direction alternately in the tire circumferential direction. Tread ends of land portions mean an outer contact end of each land portion in the tire with direction.

To mold the tread pattern as above, the vulcanization mold 10 is provided with a main groove molding rib (not shown) used to mold the main grooves 9a in the tread portion 1 and a lateral groove molding rib 18 used to form the lateral grooves 9b (see FIG. 3). The lateral groove molding rib 18 is a rib used to mold the lateral grooves 9b dividing the first land portion 7 and the second land portion 8.

The mold parting lines 16a and 17a are provided to the shoulder regions of the tread portion 1 and traverse the first land portion 7 and the second land portion 8 in the shoulder block row 6b. Herein, the mold parting lines 16a and 17a extend parallel to the tire circumferential direction along an entire circumference and distances from the tire equator CL to the respective mold parting lines 16a and 17a are set to be constant along the entire circumference.

Hence, the lateral groove molding rib 18 provided to bridge from the sectors 13 to the upper side plate 11 is divided by the mold parting line 16a. The lateral groove molding rib 18 provided to bridge from the sectors 13 to the lower side plate 12 is divided by the mold parting line 17a. Hence, the lateral groove molding rib 18 includes a first rib portion 18a provided to the sectors 13 and second rib portions 18b provided to the respective side plates 11 and 12, and formed by joining the first rib portion 18a and the second rib portions 18b along the mold parting lines 16a and 17a.

Figure 4:
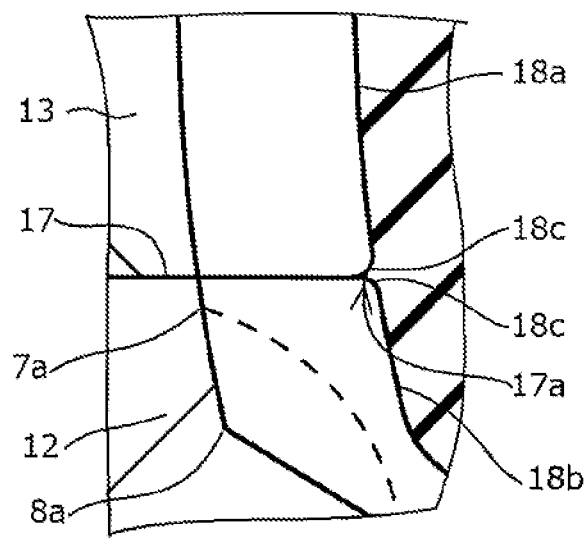
FIG. 4 is an enlarged view of a major portion of FIG. 3.

As is shown in FIG. 4, curved portions 18c and 18c are provided in a joined portion of the first rib portion 18a and the second rib portion 18b by providing a radius of curvature to edge corners close to top faces of both of the first rib portion 18a and the second rib portion 18b. The edge corner close to the top face means a corner produced by a top face of a rib portion molding a groove bottom of the lateral groove 5 and a joined surface of the ribs corresponding to the mold parting plane.

The container 30 includes multiple segments 31 to hold the sectors 13, a jacket ring 32 for moving the segments 31 in the tire radial direction, an upper attachment plate 33 supporting the upper side plate 11 and the upper bead ring 14 and disposed on an upper side of the segments 31, and a lower attachment plate 34 supporting the lower side plate 12 and the lower bead ring 15 and disposed on a lower side of the segments 31.

The segments 31 are provided on the outside of the sectors 13 in the tire radial direction in a one-to-one correspondence with the divided sectors 13. The respective segments 31 are fixed to the corresponding sectors 13 with bolts 35.

On a top surface of the segment 31, an upper sliding surface 36 inclined to the inner side in the tire width direction more on the outer side in the tire radial direction (that is, downward) is provided. The upper sliding surface 36 slides on an upper slide 37 provided to the upper attachment plate 33. On a bottom surface of the segment 31, a lower sliding surface 38 inclined to the inner side in the tire width direction more on the outer side in the tire radial direction (that is, upward) is provided. The lower sliding surface 38 slides on a lower slide 39 provided to the lower attachment plate 34.

An angle of inclination of the upper sliding surface 36 and the lower sliding surface 38 is not particularly limited. However, an angle in a range of 5° to 10° both inclusive is preferable as the angle of inclination with respect to the tire radial direction. The upper sliding surface 36 and the lower sliding surface 38 provided to the segment 31 are preferably formed of planes having no curve and slide, respectively, on the upper slide 37 and the lower slide 39 in a surface-contact state.

A side surface of the segment 31 on an opposite side to the side surface where the sector 13 is attached (on the outer side in the tire radial direction) forms an inclined surface 40 which inclines downward and outward in the tire radial direction.

The jacket ring 32 is an annular member provided on the outside of the multiple segments 31 in the radial direction. An inner peripheral surface of the jacket ring 32 inclines along the inclined surface 40 of the segment 31 provided on the outer side in the tire radial direction, and is attached to the inclined surface 40 in a slidable manner. The jacket ring 32 moves the segments 31 in the tire radial direction as the jacket ring 32 slides on the inclined surface 40 by moving up and down relatively with respect to the segments 31. The sectors 13 are thus allowed to undergo displacement in the tire radial direction by expansion and contraction.

The upper side plate 11 and the upper slide 37 are fixed to a bottom surface of the upper attachment plate 33. The upper slide 37 is disposed on the outside of the upper side plate 11 in the tire radial direction at a position at which the upper slide 37 opposes the upper sliding surface 36 provided to the top surface of the segment 31 and supports the segment 31 in a slidable manner in the tire radial direction.

The lower side plate 12 and the lower slide 39 are fixed to a top surface of the lower attachment plate 34. The lower slide 39 is disposed on the outside of the lower side plate 12 in the tire radial direction at a position at which the lower slide 39 opposes the lower sliding surface 38 provided to the bottom surface of the segment 31 and supports the segment 31 in a slidable manner in the tire radial direction.

The first lifting means 50 lifts the upper attachment plate 33 up and down relatively with respect to the lower attachment plate 34. The second lifting means 51 lifts the jacket ring 32 up and down separately from the segments 31 supported on the upper attachment plate 33.

The bladder 60 is formed of an expandable and contractable rubber elastic body of a toroidal shape in which an axial center swells outward. The bladder 60 is set on an inner surface side of the green tire and swells with a supply of a pressurized gas (for example, steam or a nitrogen gas) and thereby applies a pressure to the green tire from inside. The bladder 60 is supported by an extendable support portion 61 at an upper end and a lower end which are both ends in an axial direction. The extendable support portion 61 includes an upper clamp ring 62 fixing the upper end of the bladder 60, a lower clamp ring 63 fixing the lower end of the bladder 60, and an extendable shaft 64 capable of extending and retracting.

A production method of a pneumatic tire using the tire vulcanization device configured as above will now be described. To produce a pneumatic tire, a green tire is formed by any method known in the art and the green tire is vulcanized and molded by using the tire vulcanization device described above.

Figure 6:
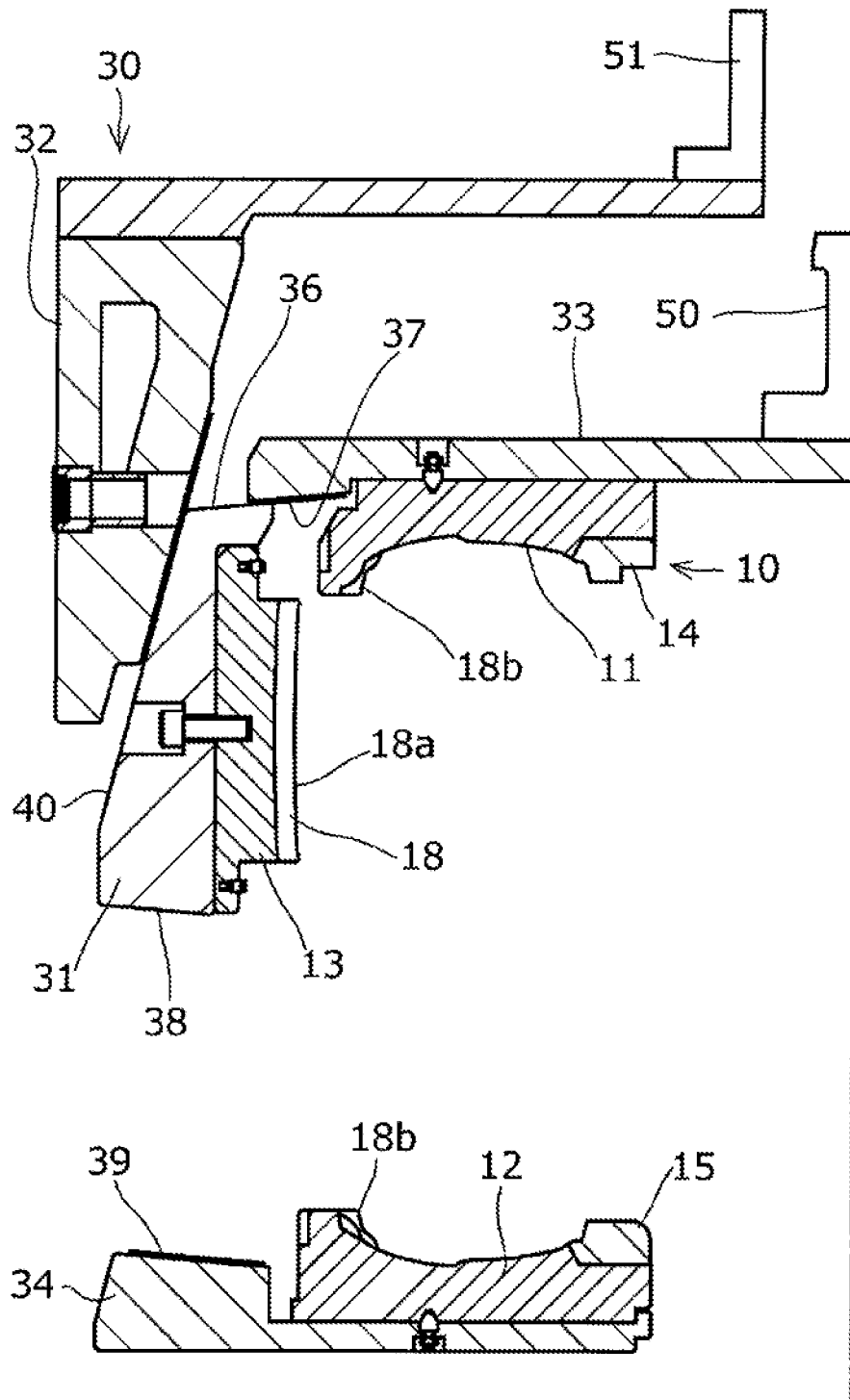
FIG. 6 is a view used to describe an opening and closing action of the tire vulcanization device.
Figure 7:
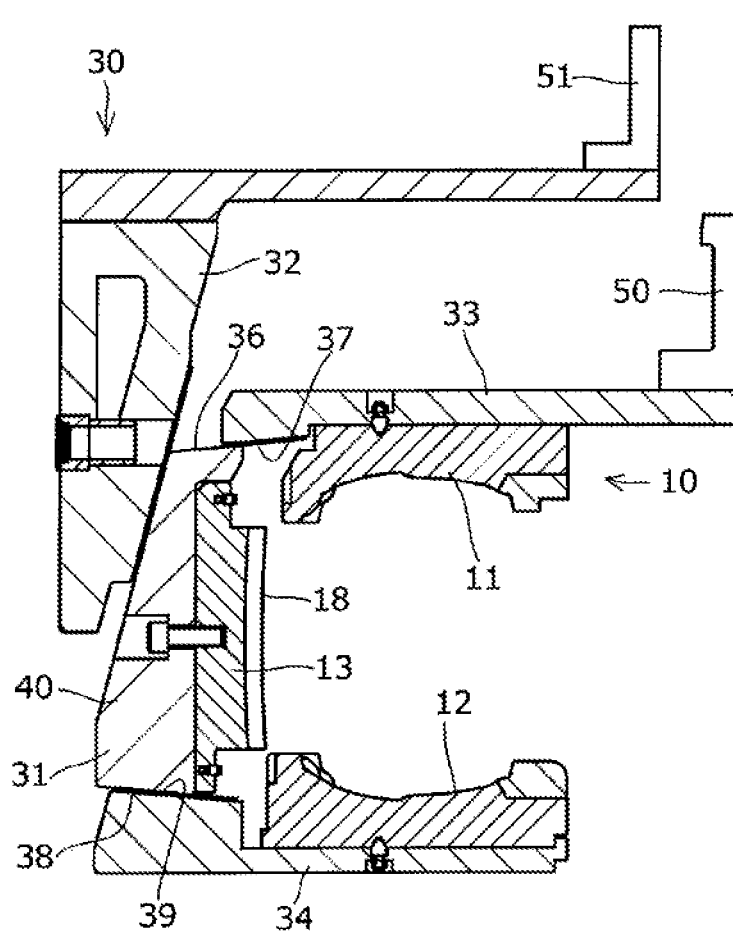
FIG. 7 is another view used to describe the opening and closing action of the tire vulcanization device.
Figure 8:
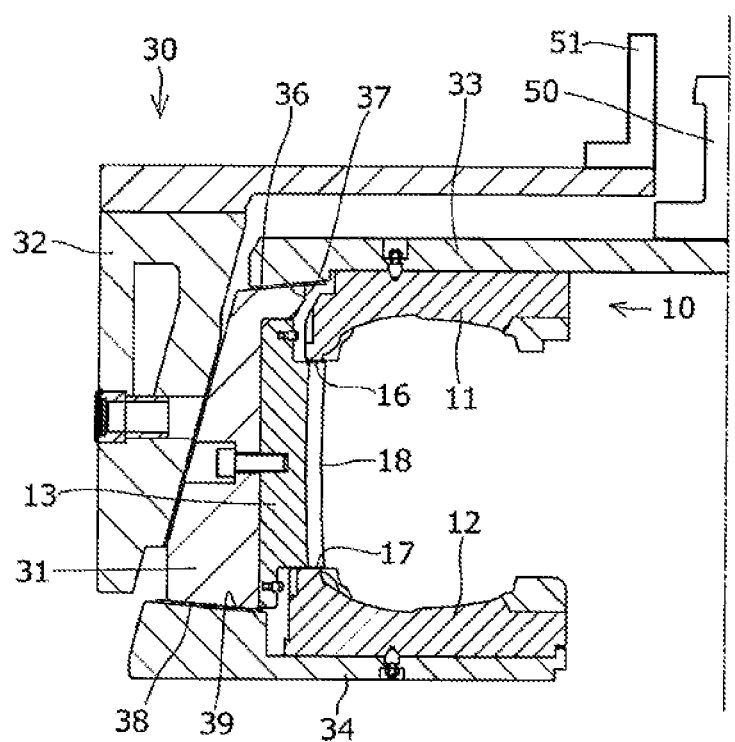
FIG. 8 is still another view used to describe the opening and closing action of the tire vulcanization device.

FIG. 6 through FIG. 8 are views used to describe an opening and closing action of the tire vulcanization device and the green tire and the bladder 60 are omitted from each drawing.

In a vulcanizing step, the green tire is attached to the vulcanization mold 10 of the tire vulcanization device in a mold open state and the bladder 60 is attached on the inner surface side of the green tire. FIG. 6 shows a mold open state in which the sector 13 and the upper side plate 11 are at positions spaced above the fixed lower side plate 12. In this state, the green tire is attached to the lower side plate 12 and then the container 30 is moved down. More specifically, by moving down the first lifting means 50, the upper side plate 11 and the sector 13 provided to the upper attachment plate 33 are moved down, that is, moved toward the lower side plate 12.

When the segment 31 makes contact with the lower attachment plate 34 as is shown in FIG. 7, the sector 13 held by the segment 31 is moved inward in the tire radial direction by lifting the jacket ring 32 down by using the second lifting means 51 as is shown in FIG. 8.

In this instance, the segment 31 moves inward in the tire radial direction as the lower sliding surface 38 slides on the lower slide 39 of the lower attachment plate 34 and the upper sliding surface 36 slides on the upper slide 37 of the upper attachment plate 33. The upper sliding surface 36 and the lower sliding surface 38 incline toward the center in the tire width direction more on the outer side in the tire radial direction. Hence, when the sector 13 together with the segment 31 moves inward in the tire radial direction, the upper side plate 11 moves down due to the inclination of the upper sliding surface 36 and the sector 13 moves down due to the inclination of the lower sliding surface 38.

Accordingly, a distance between the upper side plate 11 and the lower side plate 12 becomes shorter as the segment 31 moves inward in the tire radial direction. Spacings at the mold parting planes 16 and 17 defined by the sectors 13 and the respective upper and lower side plates 11 and 12 vanish for the first time when the mold close state shown in FIG. 1 is achieved. That is, while the sectors 13 are moving inward in the tire radial direction, a clearance is still left at the mold parting plane 16 defined by the sectors 13 and the upper side plate 11. Also, a clearance is still left at the mold parting plane 17 defined by the sectors 13 and the lower side plate 12. These clearances at the mold parting planes 16 and 17 vanish when a diameter of the sectors 13 is fully reduced.

By changing the vulcanization mold 10 to the mold close state shown in FIG. 1 in the manner as above and swelling the bladder 60 with a pressurized gas supplied inside, the green tire is pressurized and heated between the vulcanization mold 10 and the bladder 60 and the green tire is vulcanized and molded to a tire T by being maintained in the state above for a predetermined time.

After the green tire is vulcanized, the vulcanization mold 10 is changed to a mold open state to perform a removing step of removing the vulcanized tire T from the tire vulcanization device. The vulcanization mold 10 is changed from the mold close state to the mold open state by performing the mold closing action inversely.

More specifically, the sector 13 held by the segment 31 is moved outward in the tire radial direction by lifting the jacket ring 32 up by using the second lifting means 51. In this instance, when the segment 31 moves outward in the tire radial direction as is shown in FIG. 8, the upper sliding surface 36 slides outward in the tire radial direction on the upper slide 37 attached to the upper attachment plate 33 while pushing up the upper attachment plate 33. Meanwhile, the lower sliding surface 38 slides outward in the tire radial direction by climbing up the lower slide 39 attached to the lower attachment plate 34.

Figure 9:
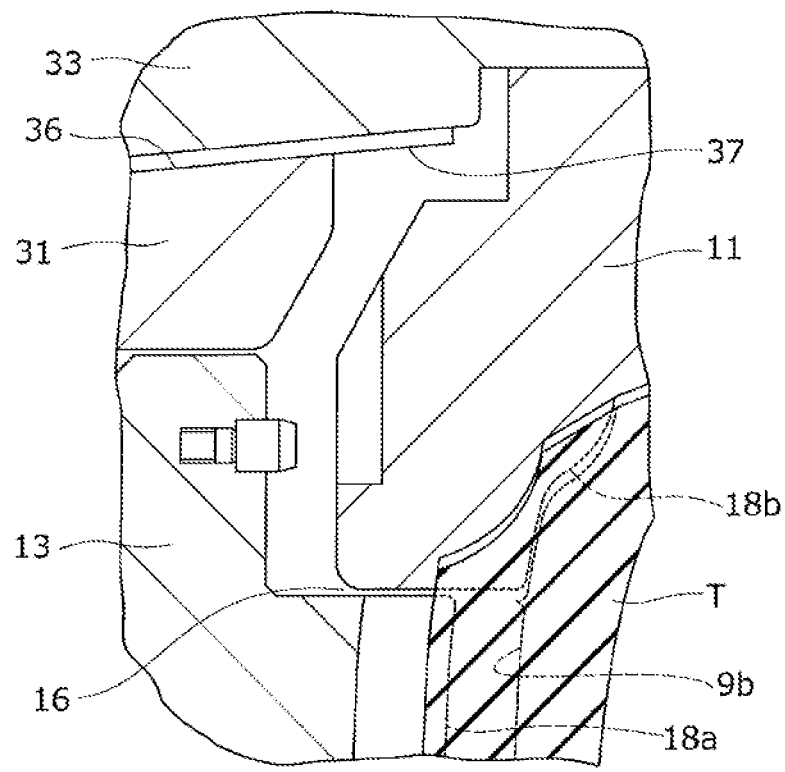
FIG. 9 is an enlarged view of a major portion of FIG. 8.

The upper attachment plate 33 pushed up by the upper sliding surface 36 moves upward with respect to the segment 31. Hence, when the segment 31 starts to move radially outward, as is shown in FIG. 9, the upper side plate 11 also moves upward with respect to the segment 31. Hence, a spacing at the mold parting plane 16 defined by the sector 13 and the upper side plate 11 increases.

Figure 10:
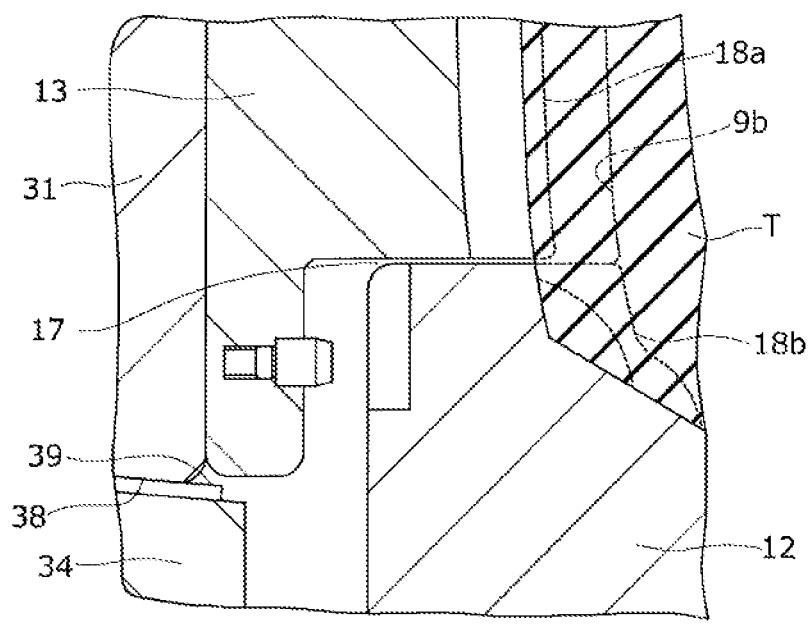
FIG. 10 is another enlarged view of the major portion of FIG. 8.

Meanwhile, in the lower sliding surface 38, when the segment 31 starts to move radially outward, as is shown in FIG. 10, the segment 31 moves upward with respect to the fixed lower attachment plate 34. Hence, a spacing at the mold parting plane 17 defined by the sector 13 and the lower side plate 12 increases.

After the diameter of the sectors 13 is fully increased as is shown in FIG. 7, the first lifting means 50 is moved up to move the upper side plate 11 and the sector 13 apart from the lower side plate 12 as is shown in FIG. 6. The vulcanized tire T is then removed from the tire vulcanization device changed to the mold open state.

In the present embodiment, the mold parting lines 16a and 17a formed by the sectors 13 and the respective side plates 11 and 12 are set within the predetermined parting line set range PR in the vicinity of the belt end positions BP of the outermost belt 5a in the tread portion 1. Hence, biting of the green tire at the mold parting lines 16a and 17a can be limited.

More specifically, by setting the mold parting lines 16a and 17a on the inner side in the tire width direction than the outer end BP2 of the parting line set range PR, when the shoulder portions of the green tire are pushed in by the second rib portions 18b during the mold closing action by the side plates 11 and 12, the shoulder portions are supported from behind by the outermost belt 5a. Hence, deformation, such as rising of an inner side of a pressed portion in the tire width direction, can be limited. Consequently, biting at the mold parting planes 16 and 17 can be limited when a radius of the sectors 13 is reduced later.

By setting the mold parting lines 16a and 17a on the outer side in the tire width direction than the inner end BP1 of the parting line set range PR, an amount of rubber pushed off to the inner side in the tire width direction by the second ribs 18b during the mold closing action by the side plates 11 and 12 can be reduced. Consequently, biting at the mold parting planes 16 and 17 can be limited when a radius of the sectors 13 is reduced later.

To confirm the biting limiting effect as above, a vulcanization molding test was conducted on pneumatic tires having the tread pattern shown in FIG. 2 (tire size: 35×12. 50R18 LT). The test was conducted for Example 1 in which the mold parting lines 16a and 17a were set at the belt end positions BP, Example 2 in which the mold parting lines 16a and 17a were set at positions on the inner side than the belt end positions BP by 5% of the outermost belt width BW (−5% position), Example 3 in which the mold parting lines 16a and 17a were set at positions on the outer side than the belt end positions BP by 5% of the outermost belt width BW (+5% position), Comparative Example 1 in which the mold parting lines 16a and 17a were set at positions on the inner side than the belt end positions BP by 10% of the outermost belt width BW (−10% position), and Comparative Example 2 in which the mold parting lines 16a and 17a were set at positions on the outer side than the belt end positions BP by 10% of the outermost belt width BW (+10% position). In each example and comparative example, 15 model tires were produced. Heights of squeezed-out rubber at the groove bottom of a particular lateral groove were found and an average height was calculated. Herein, the outermost belt width BW was 239 mm.

The heights of squeezed-out rubber caused by biting at the joined portion of the first rib portion 18a and the second rib portions 18b were 4.23 mm and 6.18 mm in Comparative Examples 1 and 2, respectively, and outward appearances were poor. On the contrary, the heights of the squeezed-out rubber were as low as 0.15 mm, 1.13 mm, and 0.82 mm in Examples 1, 2, and 3, respectively, and biting was limited. In particular, the biting was markedly limited in Example 1.

In the present embodiment, the mold parting lines 16a and 17a are set parallel to the tire circumferential direction along the entire circumference. However, the mold parting lines 16a and 17a may be provided in a zig-zag manner by periodically changing distances from the tire equator CL in the tire circumferential direction within the parting line set range PR.

In the present embodiment, the curved portions 18c and 18c are provided at the edge corners close to the top faces in a joined portion of the first rib portion 18a and the second rib portions 18b of the lateral groove rib 18. Hence, damage possibly given to the vulcanized tire T when the tire T is removed from the tire vulcanization device can be limited.

Figure 11:
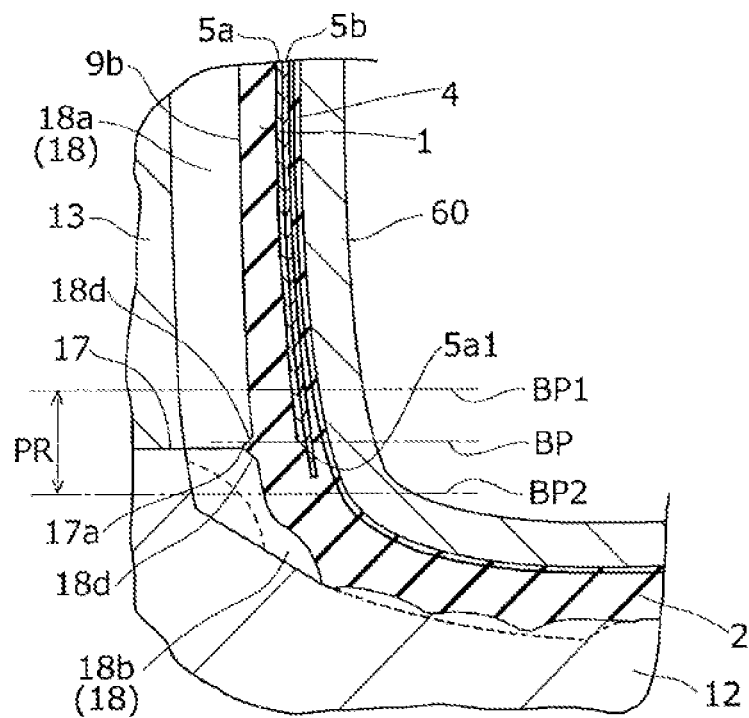
FIG. 11 is an enlarged sectional view of a major portion of a tire vulcanization device according to another embodiment during vulcanization.

In the present embodiment, the curved portions 18c are provided to the edge corners close to the top faces of the first rib portion 18a and the second rib portions 18b. However, as is shown in FIG. 11, planar chamfered portions 18d and 18d may be provided instead of the curved portions 18c, in which case, too, the same advantageous effect can be obtained. The curved portions 18c and the chamfered portions 18d are not necessarily provided to both of the first rib portion 18a and the second rib portions 18b and the curved portions 18c or the chamfered portions 18d may be provided to either the first rib portion 18a or the second rib portions 18b.

Figure 12:
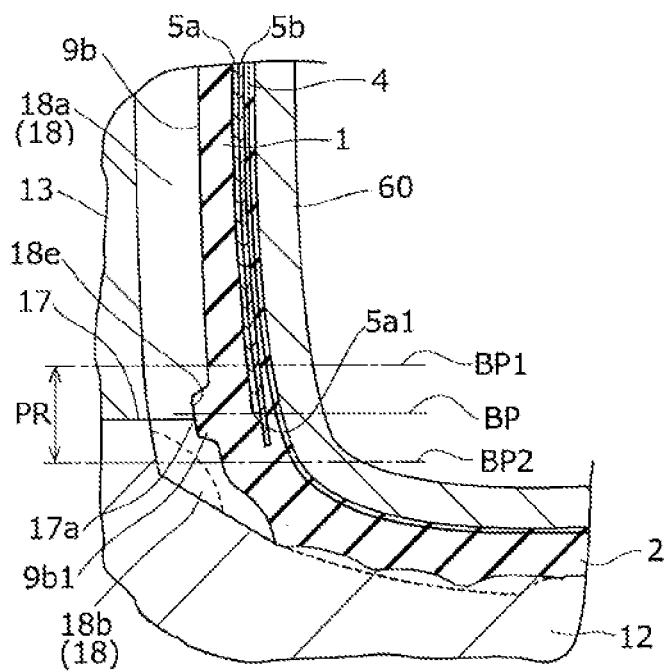
FIG. 12 is an enlarged sectional view of a major portion of a tire vulcanization device according to still another embodiment during vulcanization.

Instead of providing the curved portion 18c and the chamfered portions 18d as above, as is shown in FIG. 12, a recess 18e used to mold a rising portion 9b1 at the groove bottom of the lateral groove 9b may be provided in the joined portion of the first rib portion 18a and the second rib portion 18b. The recess 18e is provided to bridge between the first rib portion 18a and the second rib portion 18b and formed in full width of the joined portion of the two portions 18a and 18b. Hence, the recess 18e forms the rising portion 9b1 in full width in a part of the lateral groove 9b in the length direction. A top face of the rising portion 9b1 is formed in the shape of a flat table and the top face of a table shape makes a groove depth of the lateral groove 9b shallow. A height of the rising portion 9b1 is not particularly limited. For example, a height may be set 15% to 50% of the groove depth of the lateral groove 9b. By providing the recess 18e as above, biting of the green tire can be limited further. In addition, cracking at the groove bottom of the lateral groove 9b can be limited by the molded rising portion 9b1. Durability can be thus enhanced.

In the present embodiment, the upper sliding surface 36 and the lower sliding surface 38 sliding, respectively, on the upper attachment plate 33 and the lower attachment plate 34 incline to the inner side in the tire width direction more on the outer side in the tire radial direction. Hence, when the segment 31 starts to move radially outward, spacings at the mold parting planes 16 and 17 defined by the sectors 13 and the upper side plate 11 and the lower side plate 12, respectively, increase. Accordingly, even when the tire vulcanization device is repetitively opened and closed, rubbing of the mold parting planes 16 and 17 do not occur and spacings at the mold parting planes 16 and 17 can be maintained at an appropriate value. Durability of the tire vulcanization device can be thus enhanced. Moreover, the upper side plate 11 moves in a direction to separate from the vulcanized and molded tire T as soon as the segment 31 starts to move radially outward. Hence, the tire T can be readily released from the mold.

In the tire vulcanization device of the present embodiment, when the upper sliding surface 36 and the lower sliding surface 38 provided to the segment 31 are planes sliding, respectively, on the upper slide 37 and the lower slide 39 in a surface-contact state, the segment 31 is allowed to move with high positional accuracy without rattling. Misalignment of the sector 13 in a mold closed state can be thus limited.

In the present embodiment, the mold parting planes 16 and 17 are provided parallel to the tire radial direction. However, the mold parting planes 16 and 17 may be provided to incline diagonally with respect to the tire radial direction. That is, the mold parting planes 16 and 17 may be provided to incline to the outer side in the tire width direction more on the outer side in the tire radial direction. In such a case, too, a tire can be readily released from the mold owing to the inclinations of the upper sliding surface 36 and the lower sliding surface 38. In addition, in the event that the sliding surfaces 36 and 38 wear out due to repetitive mold opening and closing actions and an interval between the upper side plate 11 and the lower side plate 12 becomes narrower, the mold can be closed by gradually narrowing an interval between the upper side plate 11 and the lower side plate 12 in association with a movement of the segment 31 in the tire radial direction. Hence, rubbing of the mold parting planes 16 and 17 at an early stage can be limited, which can in turn enhance durability.

A tire referred to in the present embodiment includes a tire designed for an automobile, a heavy load tire designed for a truck, a bus, and a light truck (for example, a SUV or a pickup truck), and a pneumatic tire designed for various types of vehicles.

The embodiments above are presented as examples and have no intention to limit the scope of the invention. These novel embodiments can be implemented in various other manners and various omissions, replacements, and changes can be made within the spirit and scope of the invention.

REFERENCE SIGNS LIST

1: tread portion, 2: sidewall portion, 3: bead portion, 5*a*: outermost belt, 5*a*1: belt end, 7: first land portion, 7*a*: first tread end, 8: second land portion, 8*a*: second tread end, 9*b*: lateral groove, 10: vulcanization mold, 11: upper side plate, 12: lower side plate, 13: sector, 16 and 17: mold parting planes, 16*a* and 17*a*: mold parting lines, 31: segment, 33: upper attachment plate, 34: lower attachment plate, 36: upper sliding surface, 38: lower sliding surface, BP: belt end position, BW: outermost belt width, PR: parting line set range

The invention claimed is:

1. A tire vulcanization mold used to vulcanize and mold a tire, comprising:
   sectors divided in a tire circumferential direction and molding a tread portion of the tire; and
   a pair of upper and lower side plates molding a sidewall portion of the tire, wherein:
   mold parting lines formed by the sectors and a pair of the upper and lower side plates are located in the tread portion; and
   the mold parting lines are set within a range which accounts for up to 7.5% of a width of an outermost belt of the tire on each of an outer side and an inner side than belt end positions of the outermost belt in a tire width direction.

2. The tire vulcanization mold according to claim 1, further comprising:
   a lateral groove molding rib molding a lateral groove in the tread portion,
   wherein the lateral groove molding rib is formed by joining a first rib portion provided to the sector and a second rib portion provided to the side plate at the mold parting line.

3. The tire vulcanization mold according to claim 2, wherein:
   the tread portion includes a first land portion having a first tread end and a second land portion having a second tread end located on an outer side than the first tread end in the tire width direction; and
   the lateral groove molding rib is a rib used to mold a lateral groove dividing the first land portion and the second land portion.

4. The tire vulcanization mold according to claim 2, wherein:
   a recess used to mold a rising portion at a groove bottom of the lateral groove is provided to a joined portion of the first rib portion and the second rib portion.

5. The tire vulcanization mold according to claim 2, wherein:
   a planar chamfered portion or a curved portion is provided to an edge corner close to a top surface of one or both of the first rib portion and the second rib portion in a joined portion of the first rib portion and the second rib portion.

6. A tire vulcanization device, comprising:
   the tire vulcanization mold set forth in claim 1;
   a segment fixed to the sector and moving the sector in a tire radial direction; and
   a pair of upper and lower attachment plates fixed to a pair of the upper and lower side plates, respectively, and supporting the segment in a slidable manner.

7. The tire vulcanization device according to claim 6, wherein:
   the segment includes a pair of upper and lower sliding surfaces sliding on a pair of the upper and lower attachment plates, respectively;
   a pair of the upper and lower sliding surfaces inclines to an inner side in the tire width direction more on an outer side in the tire radial direction; and
   when the segment moves the sector outward in the tire radial direction, a pair of the upper and lower sliding surfaces slides on a pair of the upper and lower attachment plates, respectively, and spacings at mold parting planes including the mold parting lines widen.

8. The tire vulcanization device according to claim 7, wherein:
   the mold parting planes including the mold parting lines are provided parallel to the tire radial direction.

9. A tire production method, comprising:
   a forming step of forming a green tire; and
   a vulcanizing step of vulcanizing and molding the green tire by using the tire vulcanization device set forth in claim 6.

* * * * *